(12) United States Patent
Breslow et al.

(10) Patent No.: US 6,331,530 B1
(45) Date of Patent: Dec. 18, 2001

(54) HYDROPHILIC CARRIER FOR PHOTOSENSITIZERS THAT CLEAVES WHEN THEY CATALYZE THE FORMATION OF SINGLET OXYGEN

(75) Inventors: Ronald Breslow, Englewood, NJ (US); Anja Ruebner, Philadelphia, PA (US); Zhiwei Yang, Pasadena, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/352,529

(22) Filed: Jul. 13, 1999

(51) Int. Cl.[7] .......................... A61K 31/715; C08B 37/16
(52) U.S. Cl. ............................ 514/58; 514/410; 536/103
(58) Field of Search ...................... 514/58, 410; 536/103

(56) References Cited

U.S. PATENT DOCUMENTS

| | | | |
|---|---|---|---|
| 4,988,808 | 1/1991 | Morgan et al. | 540/145 |
| 5,109,129 | 4/1992 | Morgan et al. | 540/145 |
| 5,250,668 | 10/1993 | Morgan et al. | 540/145 |
| 5,438,051 | 8/1995 | Morgan et al. | 514/185 |
| 5,482,719 | 1/1996 | Guillet et al. | 424/486 |
| 5,552,134 | 9/1996 | Morgan et al. | 424/9.61 |
| 5,705,622 * | 1/1998 | McCapra | 536/23.1 |

FOREIGN PATENT DOCUMENTS 19620154    3/1997  (DE) .

OTHER PUBLICATIONS

Ruebner et al. *Proceedings of the National Academy of Sciences*, Dec. 1999, 96(26), 14692–14693.*
Breslow et al. *J. Am. Chem. Soc.* 1998, 120, 3536–3537. Web publication date Mar. 28, 1998.*
Breslow, R., Halfon, S., and Zhang, B. (1995) Molecular recognition by cyclodextrin dimers. Tetrahedron 51: 377–388.
Moser, J.G., Heuermann, A., Oehr, P., Scheer, H., Vervoots, A., and Andrees, S. (1994) Carrier systems in PDT: On the way to novel anti–tumor drugs. SIPE Conf. Proc. vol. 2325 Photodynamic Therapy of Cancer II, pp 92–99.

Moser, J.G., Ruebner, A., Vervoots, A., and Wagner, B. (1996) Cyclodextrin dimers used to prevent side effects of photochemotherapy and general tumor chemotherapy. In: Szejtli, J. and Szente, L. (eds.), Proceedings of the Eight International Symposium on Cyclodextrons, Kluwer Academic Publishers, pp 71–76.

Ruebner, A. et al. (1996) Synthesis of β–cyclodextrin dimers as carrier systems for photodynamic therapy of cancer. In: Szejtli, J. and Szente, L. (eds.), Proceedings of the Eight International Symposium on Cyclodextrons, Kluwer Academic Publishers, pp 77–80.

Ruebner, A. et al. (1997) Dimeric cyclodextrin carriers with high binding affinity to porphyrinoid photosensitizers. Journal of Inclusion Phenomena and Molecular Recognition in Chemistry 27: 69–84.

Sauter, M. and Adam, W. (1995) Oxyfunctionalization of benzofurans by singlet oxygen, dioxiranes, and peracids: chemical model studies for the DNA–damaging activity of benzofuran dioxetanes (oxidation) and epoxides (alkylation). Acc. Chem. Res. 28: 289–298.

* cited by examiner

*Primary Examiner*—Kathleen Kahler Fonda
(74) *Attorney, Agent, or Firm*—John P. White; Cooper & Dunham LLP

(57) ABSTRACT

The invention provides a composition of matter comprising two β-cyclodextrin molecules and a cleavable linker attached to and joining each such β-cyclodextrin. This invention further provides a composition which comprises a hydrophilic matrix comprising the above-described composition of matter and a photosensitizer encapsulated within the matrix, wherein the cleavable linker is cleaved upon exposure to light of a wavelength appropriate for the light to be absorbed by the photosensltlzer. This invention also provides a method of killing a tumor cell which comprises bringing into proximity with the tumor cell the above-described composition and exposing the composition to light so as to cleave the cleavable linker and release the photosensitizer.

11 Claims, 5 Drawing Sheets

US 6,331,530 B1

HYDROPHILIC CARRIER FOR PHOTOSENSITIZERS THAT CLEAVES WHEN THEY CATALYZE THE FORMATION OF SINGLET OXYGEN

The invention disclosed herein was made with Government support under grant No. GM-18754 from the National Institutes of Health, U.S. Department of Health and Human Services. Accordingly, the U.S. Government has certain rights in this invention.

BACKGROUND OF THE INVENTION

Throughout this application, various publications are referenced in parentheses by author and year. Full citations for these references may be found at the end of the specification immediately preceding the claims. The disclosures of these publications in their entireties are hereby incorporated by reference into this application to more fully describe the state of the art to which this invention pertains.

Photodynamic therapy of cancers uses a combination of light-activated drugs (photosensitizers) and laser light to create highly reactive forms of oxygen (singlet oxygen) that destroy tumor cells. Porphyrinoid dyes are photosensitizers which are widely used in photodynamic therapy. However, one major drawback of these hydrophobic photosensitizers is that they are not selective to tumor tissue because they are transported to every organ by blood lipoproteins of the blood stream (Moser et al., 1994). One way to prevent this is to attach the photosensitizer to cancer-specific antibodies and use cyclodextrin dimers to encapsulate the dye so that it cannot interact with lipoproteins (Ruebner et al., 1996, 1997).

Another strategy is presented in the present application, which contains the first disclosure of β-cyclodextrin dimers having a cleavable linker between two β-cyclodextrin molecules. The β-cyclodextrin dimers can serve as hydrophilic carriers for photosensitizers, which can be administered to a subject with cancer. The β-cyclodextrin dimer can be cleaved by light, which can be selectively directed at the tumor site. The dye will then be released and be able to go into tumor cells. After the dimer is cleaved, the concentration of uncleaved β-cyclodextrin dimers at the tumor site will be reduced and more uncleaved β-cyclodextrin dimers will diffuse into the tumor site due to the concentration gradient. In this way, photosensitizer can be concentrated in the tumor without the use of a cancer-specific antibody.

SUMMARY OF THE INVENTION

The invention provides a composition of matter comprising two β-cyclodextrin molecules and a cleavable linker attached to and joining each such β-cyclodextrin.

This invention further provides a composition which comprises a hydrophilic matrix comprising the above-described composition of matter and a photosensitizer encapsulated within the matrix, wherein the cleavable linker is cleaved upon exposure to light of a wavelength appropriate for the light to be absorbed by the photosensitizer.

This invention also provides a method of killing a tumor cell which comprises bringing into proximity with the tumor cell the above-described composition and exposing the composition to light so as to cleave the cleavable linker and release the photosensitizer.

DETAILED DESCRIPTION OF THE INVENTION

The invention provides a composition of matter comprising two β-cyclodextrin molecules and a cleavable linker attached to and joining each such β-cyclodextrin. The cleavable linker is cleavable by singlet oxygen. In one embodiment, the cleavable linker comprises a carbon-carbon double bond. In a preferred embodiment, the carbon-carbon double bond is substituted on one or both ends by an electron rich atom. The electron rich atom is selected from a group that includes sulfur, oxygen, and nitrogen.

In one embodiment, the composition of matter has the structure:

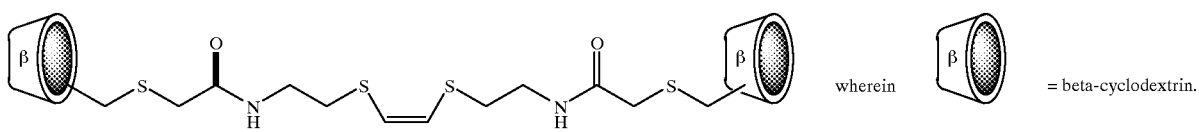

This invention further provides a composition which comprises a hydrophilic matrix comprising any of the above-described compositions of matter and a photosensitizer encapsulated within the matrix. The photosensitizer is selected from a group that includes porphyrins, phthalocyanines, naphthalocyanines, chlorins, pheophorbides, and bacteriopheophorbides.

In a preferred embodiment, the cleavable linker is cleaved upon exposure to light of a wavelength appropriate for the light to be absorbed by the photosensitizer. The photosensitizer is released when the cleavable linker is cleaved.

This invention also provides a method of killing a tumor cell which comprises bringing into proximity with the tumor cell any of the above-described compositions and exposing the composition to light so as to cleave the cleavable linker and release the photosensitizer. The absorption of light by the photosensitizer excites the photosensitizer, and the cleavable linker is cleaved by singlet oxygen that is formed by energy transfer from an excited state of the photosensitizer. The method further provides that the photosensitizer is concentrated at the tumor cell. In one embodiment, a plurality of converging light beams is used to focus light on the tumor cell.

This invention will be better understood from the Experimental Details which follow. However, one skilled in the art will readily appreciate that the specific methods and results discussed are merely illustrative of the invention as described more fully in the claims which follow thereafter.

Experimental Details

The following Experimental Details are set forth to aid in an understanding of the invention, and are not intended, and should not be construed, to limit in any way the invention set forth in the claims which follow thereafter.

Figure 1:
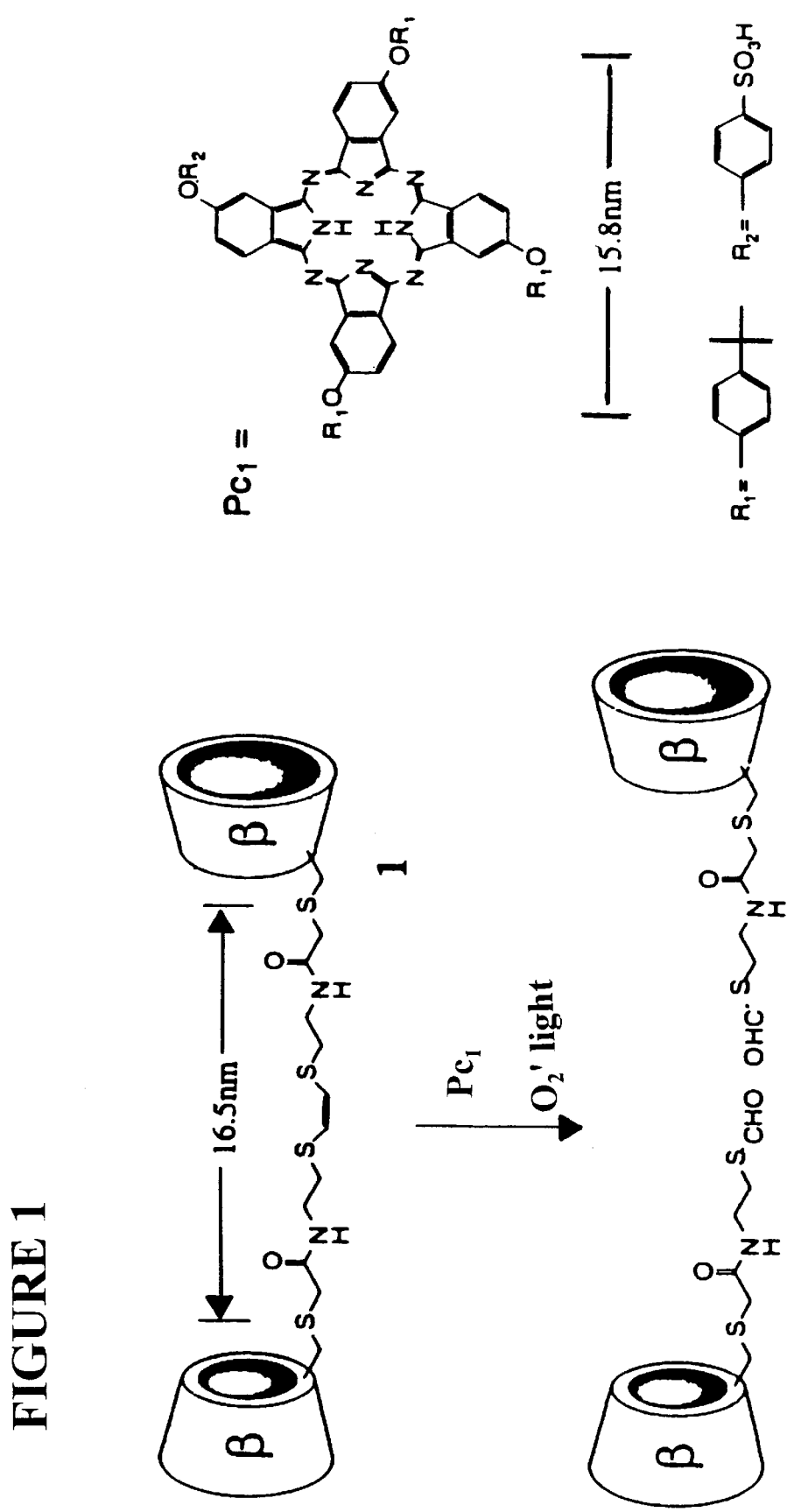
FIG. 1. β-Cyclodextrin dimers with photocleavable linkers as carriers for photosensitizers in the photodynamic therapy of cancers. The linker joining the β-cyclodextrin molecules is cleaved by photoirradiation causing the release of the photosensitizer, which in the case illustrated is a phthalocyanine ($Pc_1$).

The synthesis of a β-cyclodextrin dimer is disclosed, wherein two β-cyclodextrin molecules are joined by a cleavable linker. The β-cyclodextrin dimer can bind photosensitizers and then release them when the linker is cleaved by singlet oxygen produced when the photosensitizer is exposed to light. This system was designed for the photodynamic therapy of cancer, but it may also be useful in other fields.

β-Cyclodextrin dimers with cleavable linkers as carriers for photosensitizer are illustrated in FIG. 1. The linker in β-cyclodextrin dimer 1 shown in the top left of FIG. 1 has two sulfur atoms directly attached to a C=C double bond which make the bond electron rich and thus susceptible to attack by singlet oxygen which cleaves the linker. The length of the linker was calculated to be 16.5 nm by MacroModel, which fits well with the size of phthalocyanine ($Pc_1$ in FIG. 1, 15.8 nm). $Pc_1$ has properties that make it ideal for use in the photodynamic therapy of cancer. $Pc_1$ is a known compound that can be easily synthesized (Kliesch et al., 1995). $Pc_1$ absorbs at long wavelength ($\lambda_m$=678 nm) and has good quantum yield of singlet oxygen. The two 4-tert-butylphenol groups of $Pc_1$ can be bound by hydrophobic bonds to β-cyclodextrin dimers with the proper linkers (Ruebner et al., 1997). The length of the linkers can be varied to accommodate different size photosensitizers. $Pc_1$ was selected for the experiments described below.

Figure 2:
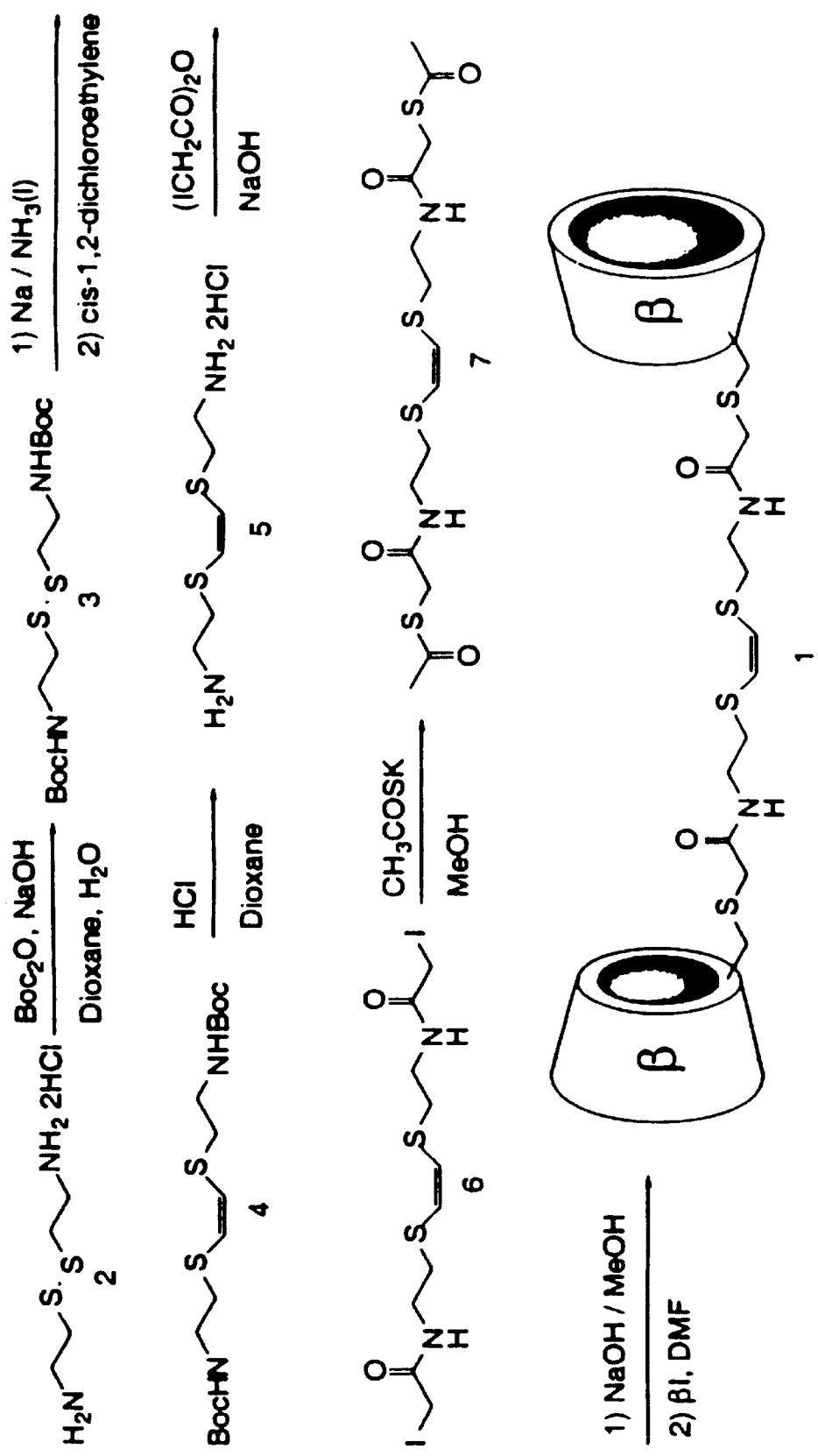
FIG. 2. Synthesis of β-cyclodextrin dimer with photocleavable linker. Detailed description of synthesis is in text.

Synthesis of β-Cyclodextrin Dimer with a Cleavable Linker

β-Cyclodextrin dimer 1 was synthesized as shown in FIG. 2. Cystamine 2 (FIG. 2, upper left) was first protected with tert-butylcarbonyl (Boc) to give reaction product 3. Then the disulfide bond was reduced by sodium in liquid ammonia for 45 minutes. The reaction was carefully quenched with a minimum amount of ammonium chloride, and the free thiolate was reacted with cis-1,2-dichloroethylene. The reaction produced the Boc-protected reaction product 4 as a white solid. The amount of ammonium chloride must be carefully controlled, because an excess amount will give a liquid product. The Boc groups were removed by HCl, and the deprotected diamine was obtained as its HCl salt (reaction product 5). The salt is photocleavable by singlet oxygen in aqueous solution. The salt (reaction product 5) is soluble in water and alcohol but not in other organic solvents such as acetone, dimethylformamide (DMF), dimethyl sulphoxide (DMSO), or dioxane. Many attempts to react this salt to acid chloride in the presence of base or to extract the free amine with organic solvents failed. However, the biphasic reaction of the salt with iodoacetic anhydride went smoothly after two minutes of vortex (cf. Luduena et al., 1981). The resulting reaction product 6 was purified by filtering out the precipitated product and washed with water. After product 6 was reacted with potassium thioacetate and hydrolyzed with base, the resulting free dithiolate linker (reaction product 7) was reacted with β-cyclodextrin monoiodide to give the primary face-linked β-cyclodextrin dimer 1. The details of the steps of the synthesis are described below in the section entitled "Detailed Synthesis Of β-Cyclodextrin Dimer With A Cleavable Linke".

Binding of β-Cyclodextrin Dimer 1 to Phthalocyanine

Figure 3:
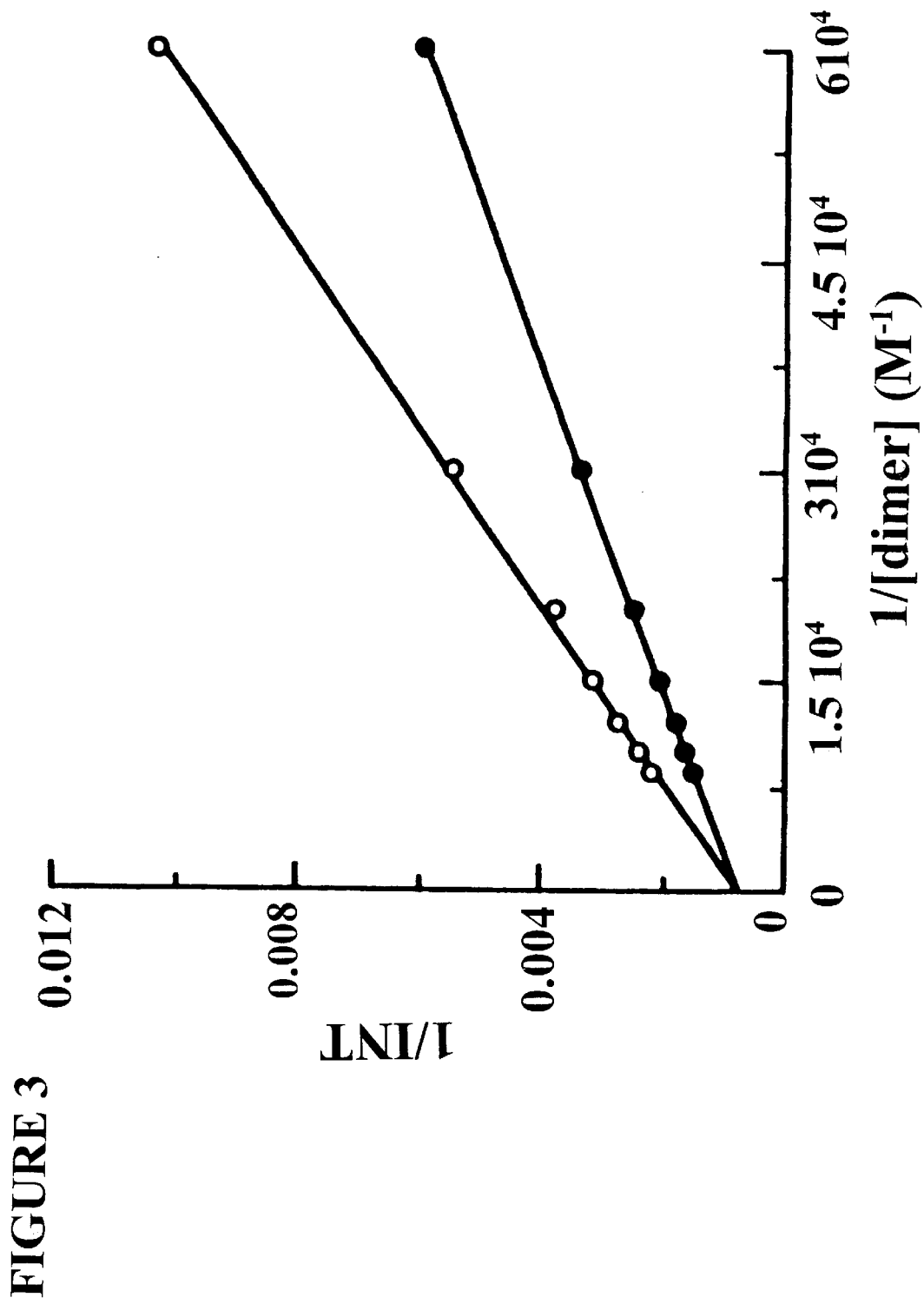
FIG. 3. Plot of binding of 6-(p-toluidino)-2-naphthalenesulfonic acid (TNS) to β-cyclodextrin dimer. The reciprocal of fluorescent intensity is plotted as a function of the reciprocal of β-cyclodextrin dimer concentration. Filled circles: 3.0 ml of 10 μM TNS were titrated with 10 nM β-cyclodextrin dimer, 5 μl/injection.
Open circles: 3.0 ml of 10 μM TNS plus 3.5 μM $Pc_1$ were titrated with 10 nM β-cyclodextrin dimer, 5 μl/injection.

The binding constant of β-cyclodextrin dimer 1 to $Pc_1$ was determined by its fluorescence competition with 6-(p-toluidino)-2-naphthalenesulfonic acid (TNS). TNS has almost no fluorescence in aqueous solution, but it is strongly fluorescent when it is bound to hydrophobic cavities such as β-cyclodextrins or proteins. The binding constant of TNS to dimer 1 was determined by titrating dimer 1 into TNS in a fluorescent cell, using excitation at 330 nm, and measuring the fluorescent emission at 435 nm. The binding constant of $Pc_1$ to dimer 1 was measured by titration of dimer 1 into a mixture of TNS and $Pc_1$. The data yielded straight lines when plotted as the reciprocal of β-cyclodextrin dimer concentration versus the reciprocal of fluorescent intensity (FIG. 3). The binding constant of TNS to dimer 1 is given by k=slope/intercept, and the binding constant of $Pc_1$ can be calculated as $K_f=(k/k'-1)/[I]$, where k' is the apparent binding constant of TNS to β-cyclodextrin dimer in the presence of Pc1, and [I] is the concentration of $Pc_1$ (Roberts, 1977; Ruebner et al., 1997). The results are: k=8.19×10$^3$M$^{-1}$ and $K_f$=2.16×10$^5$M$^{-1}$. β-Cyclodextrin binds 4-tertbutylbenzoic acid with a binding constant of 2.0×10$^4$M$^{-1}$, so the dimer binds the dye about 10 times stronger than monomeric cyclodextrins.

Cleavage of β-Cyclodextrin Dimer 1

Figure 4:
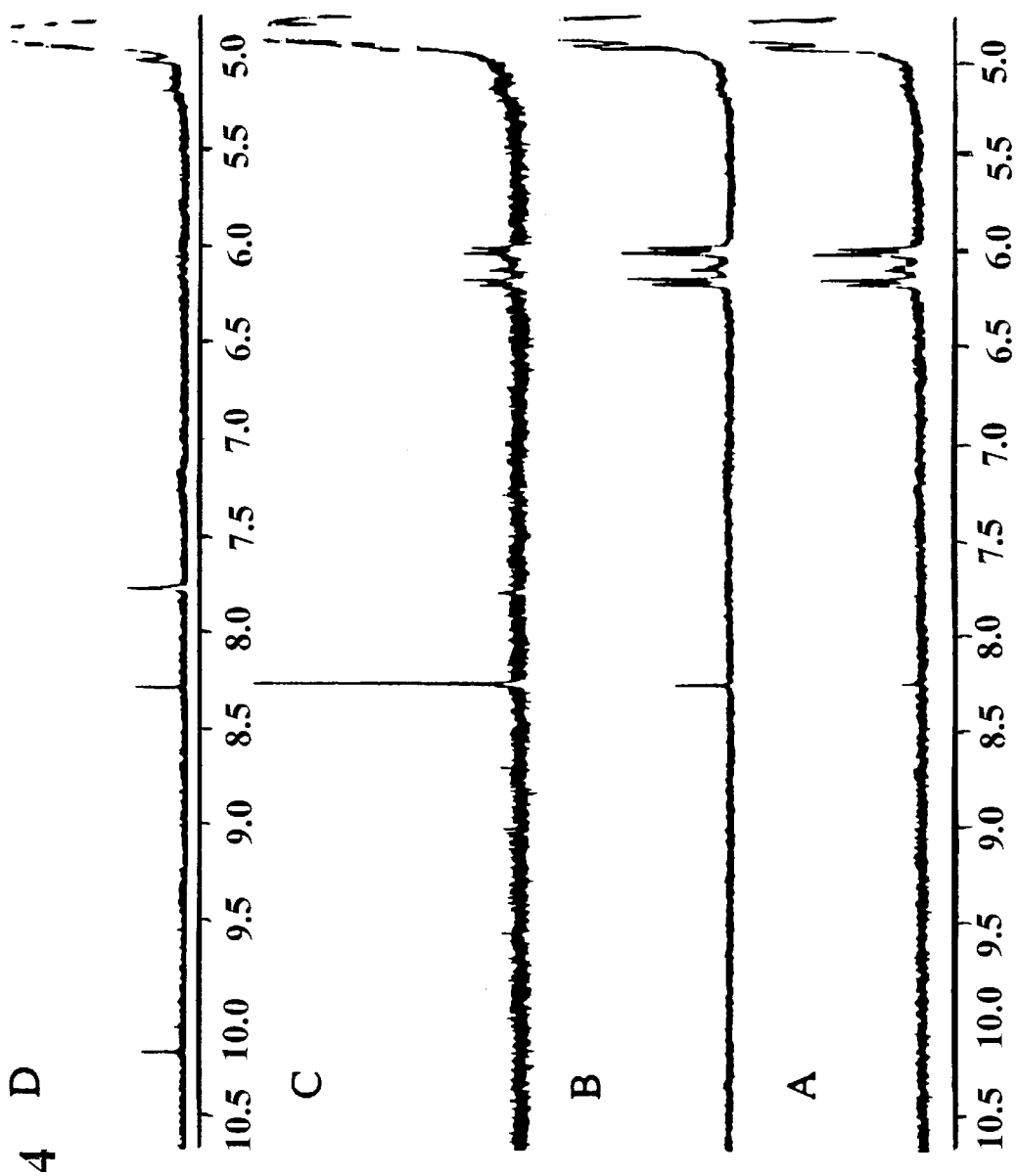
FIG. 4. Cleavage of β-cyclodextrin dimer by singlet oxygen monitored by NMR.
A–C: Phthalocyanine was mixed with β-cyclodextrin dimer, bubbled with oxygen, and exposed to yellow light.
  A: at time 0 minutes;
  B: after 10 minutes exposure to light;
  C: after 120 minutes exposure to light.
D: β-cylodextrin dimer cleaved by methylene blue.

The linker of β-cyclodextrin dimer 1 can be cleaved by singlet oxygen. The reaction was performed in $D_2O$ and monitored by nuclear magnetic resonance (NMR) (FIG. 4). 6.0 mg of dimer 1 and 2 mg of $K_2CO_3$ were dissolved in 1.0 ml $D_2O$ and put in an NMR tube. 50 μl of a 3mM $Pc_1$ solution (in DMSO-d-6) was added. The NMR tube was irradiated with a halogen lamp (300 W with a cut-off filter to exclude wavelengths shorter than 540 nm). The light power at the NMR tube wag about 0.1 W/cm$^2$. Oxygen was bubbled through the solution during irradiation. NMR was taken every 10 minutes. $10^{-3}$ M methylene blue solution was used to replace $Pc_1$ in another experiment. In a third experiment, 4.0 mg compound 5 were dissolved in 1.0 ml $D_2O$, to which 10 µl of 1 mM methylene blue solution was added.

The CH proton on the C=C double bond is a sharp singlet at 6.2 ppm in DMSO, but becomes a pair of doublets at 6.0 and 6.2 ppm in $D_2O$ (FIG. 4A). when methylene blue was used as a photosensitizer, these two doublet peaks disappeared after 80 minutes of reaction and a new peak of thioformate appeared at 8.3 ppm in the cleavage products (FIG. 4D). A similar peak was also observed in the photocleavage product of reaction product 5 (not illustrated). The two new peaks at 10.2 and 7.8 ppm in FIG. 4D indicate that other parts of the β-cyclodextrin dimer were also oxidized. This is not a surprise because methylene blue does not bind to the dimer, so the oxidation reaction is not very selective. On the other hand, when $Pc_1$ was used as the photosensitizer, only the peak at 8.3 ppm appeared (FIGS. 4B, 4C), which means that the singlet oxygen generated by phthalocyanine reacted exclusively with the C=C double bond in the linker. More than 70% of β-cyclodextrin dimer was cleaved by 5 percent $PC_1$ after 120 minutes exposure to light.

Figure 5:
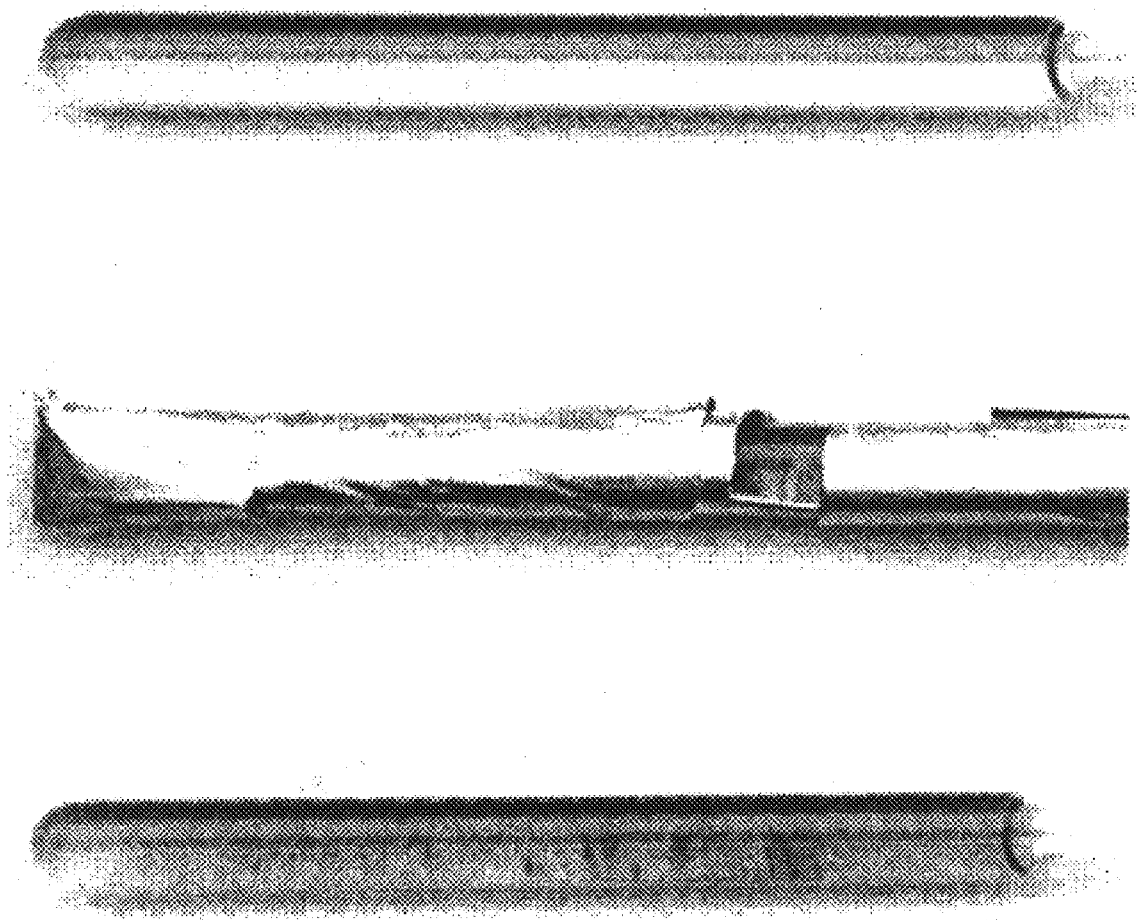
FIG. 5. Local precipitation of phthalocyanine when the β-cylodextrin dimer to which it was bound was cleaved by photoirradiation.
Top: Prior to exposure to light the solution containing $Pc_1$ bound to β-cylodextrin dimer was clear.
Middle: A small hole was cut in foil placed over the tube containing the solution, and the exposed portion of the tube was irradiated with light.
Bottom: Phthalocyanine precipitate is concentrated in the portion of the tube that was exposed to light.

Use of β-Cyclodextrin Dimer 1 Carrier for Photosensitizers in Photodynamic Therapy Photocleavace of β-Cyclodextrin Dimer and Release of Photosensitizer The photosensitizer $Pc_1$ shown in FIG. 1 cannot be dissolved directly in water. If a concentrated DMSO solution of $Pc_1$ is added to water, it will precipitate out and give a cloudy solution. When $Pc_1$ is bound to β-cyclodextrin dimer 1 as a carrier, the bound $Pc_1$ is soluble in water. A NMR tube was filled with 1 ml of $Pc_1$ and β-cyclodextrin dimer solution (FIG. 5, top), and then the tube was wrapped with aluminum foil (FIG. 5, middle). A small hole was cut in the foil, and a portion of the NMR tube was exposed to light through the hole in the foil. After 2 hours, the solution near the hole became cloudy and the dye was concentrated in that area (FIG. 5, bottom).

A new mode of therapy is suggested whereby a photosensitizer can be bound to β-cyclodextrin dimer and injected into the body. Then light can be directed selectively at a tumor area. The light could be ordinary light or laser light. The light must have a wavelength appropriate for the photosensitizer to absorb the light. Multiple converging light beams can be used to focus light at the tumor site in order to obtain good geometric control of the location where the light is focused. The absorption of light by the photosensitizer will excite the photosensitizer. The β-cyclodextrin dimer will be cleaved by singlet oxygen that is formed by energy transfer from the excited state of the photosensitizer. The singlet oxygen cleaves the susceptible group in the linker of the dimer. After cleavage of the β-cyclodextrin dimer, the photosensitizer will be released at the tumor site. The tumor cells will be killed by singlet oxygen produced by energy transfer after excitation of the photosensitizer. The local concentration of the intact dimer-photosensitizer complex will be lower after cleavage of the dimer, and more complex will diffuse into the tumor site due to the concentration gradient. Once released from the dimer, the photosensitizer will tend not to diffuse away from the tumor site since the photosensitizer is not as soluble as the dimer-photosensitizer complex. In this way, photosensitizer can be concentrated in the tumor without being attached to a cancer-specific antibody. This is important because such antibodies may not be available. In addition, the use of the β-cyclodextrin photocleavable dimer is more cost effective.

Detailed Synthesis of β-Cyclodextrin Dimer with a Cleavable Linker

Cystamine Di-t.butyldicarbonate (Compound 3 in FIG. 1)

4 g (17.7 mmol) of cystamine were dissolved in 30 ml dioxane/water (1:1). 1.4 g (35.4 mmol) sodium hydroxide were added. The solution was cooled with an icebath to 0° C. 8.2 g (38.8 mmol) di-tert-butyldicarbonate ($Boc_2O$) were added. The solution was brought to room temperature while stirring for 30 min. After a few minutes a precipitate appeared. After rot-vapping of the solvent the solid was dissolved in ethyl acetate. Insoluble parts (salts) were removed by filtration. The organic layer was washed with 1 M HCl, water, and 1 M NaOH, then dried with $MgSO_4$. 6.4 g of compound 3 were obtained as a white solid after rot-vap. Proton NMR (300M Hz in DMSO-d-6): δ6.95(t, 2H), 3.18(q, 4H), 2.51(t, 4H), 1.37(s, 18H). MS: 353(M+1).

Compound 4

2.0 g of compound 3 (5.6 mmol) were placed in a small 3-neck-flask and evacuated and flashed with argon three times. 30 ml ammonia were condensed into the flask. Pieces of sodium were put into the flask until the color of the solution remained blue. The solution was stirred for 30 minutes, and more sodium was added if the blue color disappeared. A minimum amount of solid ammonium chloride was added to quench the reaction until the solution became colorless. 410 µl (5.5 mmol) of cis-1,2-dichloroethylene were added with a syringe. The reaction was stirred for 4 hours; then the ammonia was evaporated at room temperature. The solid was dissolved in a mixture of water and ethyl acetate. The ethyl acetate phase was separated by a funnel and washed with water, dried with magnesium sulfate and rot-vapped to give compound 4 as a white solid (2.2 g, yield=96%). The product was pure enough for further reactions. Proton NMR (300M Hz in DMSO d-6): δ6.95(t, 2H), 6.20 (s, 2H), 3.09(q, 4 H), 2.74(t, 4H), 1.36(s, 9H). MS: 379(M+1).

Compound 5

0.50 g (1.3 mmol) of the Boc-protected linker 4 were dissolved in 8 ml dioxane. 10 ml HCl/dioxane were added, and the solution was stirred at room temperature for 1 hour. During this time the product 5 precipitated. After filtration, the crude product was dissolved in methanol and precipitated with methylene chloride. The product was filtered out and dried to give pure compound 5 as di-hydrochloric acid salt (0.28 g, yield=86%). Proton NMR (300M Hz in $D_2O$): δ6.31(s, 2H), 3.15 ppm (t, 4H), 3.01(t, 4H). MS: 179(M+1).

Compound 6

0.20 g of compound 5 were dissolved in 40 ml of 0.1M sodium hydroxide aqueous solution. 0.78 g iodoacetic anhydride were dissolved in 10 ml of 1,2-dichloroethane and added to the compound 5 solution. The mixture was vortexed for 2 minutes. The product was formed as a white precipitate and was filtered out by a trit funnel. After washing with water and dried, 0.34 g of compound 6 were obtained (yield=85%). Proton NMR (300M Hz in DMSO-d-6): δ8.45(t, 2H), 6.25(s, 2H), 3.64(s, 4H), 3.25(q, 4H), 2.88(t, 4H).

Compound 7

0.22 g compound 6 (0.428 mmol) and 0.11 g of potassium thioacetate (0.95 mmol) were dissolved in 80 ml of methanol. The solution was vacuumed and purged with argon three times, and then stirred under argon at 50° C. for 4 hours. Methanol was removed by rot-vap, and the residue was extracted with ethyl acetate and water. The organic phase was washed with water and dried with magnesium sulfate, and the solvent was removed by vacuum to give compound 7 as a white powder (0.15 g, yield=84%). Proton NMR (300M Hz in CD$_3$OD): δ6.18(S, 2H), 3.61(s, 4H), 3.37(t, 4H), 2.80(t, 4H), 2.46(s, 6H).

Dimer 1

0.20 g compound 7 and 0.1 g potassium hydroxide were dissolved in 100 ml methanol. The solution was vacuumed and purged with argon three times. After stirring at 50° C. for 10 minutes, methanol was removed by vacuum. The residue was dissolved in 40 ml of dry DMF. 1.0 g of mono-6-iodo-6-deoxy-β-cyclodextrin was added. The reaction was stirred at 50° C. under argon overnight, then poured into 1 liter of acetone, and filtered with a frit funnel. The solid was dissolved in water and loaded on a reverse phase silica gel column, eluted with methanol-water liner gradient (methanol 20–80%, v/v). The fraction containing the product was collected. Methanol was removed by rot-vap. After lyophilization, 0.23 g of dimer 1 were obtained as a white solid. Proton NMR (300M Hz in DMSO-d-6): δ8.09(t, 2H), 6.22(s, 2H), 5.6–5.9(m, 28H), 4.7–4.95(m, 14H), 4.40–4.55 (m, 12H), 3.45–3.90(m, 56H), 2.77(t, 4H). Fab MS: 2560 (M+2).

REFERENCES

Kliesch, H., A. Weitemeyer, S. Muller, and D. Wohrle (1995) *Liebigs Ann* 1269.

Luduena, R. F., M. C. Roach, P. P. Trcka, and S. Weintraub (1981) N,N-Bis(alpha-iodoacetyl)-2,2'-dithiobis (ethylamine), a reversible crosslinking reagent for protein sulfhydryl groups. *Anal. Biochem.* 117: 76–80.

Moser, J. G., A. Heuermann, P. Oehr, H. Scheer, A. Vervoorts, and S. Andrees (1994) *SIPE. Conf. Proc.* 92: 2325.

Roberts, D. V. (Ed.) (1977) *Enzyme Kinetics,* Cambridge University Press, pp 49–59.

Ruebner, A., D. Kirsch, S. Andrees, W. Decker, B. Roeder, B. Spengler, R. Kaufmann, and J. G. Moser (1997) Dimeric cyclodextrin carriers with high binding affinity to porphyrinoid photosensitizers. *Journal of Inclusion Phenomena and Molecular Recognition in Chemistry* 27: 69–84.

Ruebner, A., J. G. Moser, D. Kirsch, B. Spengler, S. Andrees, and S. Roehrs (1996) Synthesis of β-cyclodextrin dimers as carrier systems for photodynamic therapy of cancer. In: Szejtli, J. and L. Szente (Ed.), *Proceedings of the Eight International Symposium on Cyclodextrons,* Kluwer Academic Publishers, pp 77–80.

What is claimed is:

1. A composition of matter comprising two β-cyclodextrin molecules and a cleavable linker joining each such β-cyclodextrin, wherein the cleavable linker comprises a carbon-carbon double bond substituted on one or both ends by an electron rich atom, and the cleavable linker is cleavable by singlet oxygen.

2. The composition of matter of claim 1, wherein the electron rich atom is sulfur, oxygen, or nitrogen.

3. The composition of matter of claim 2, having the structure:

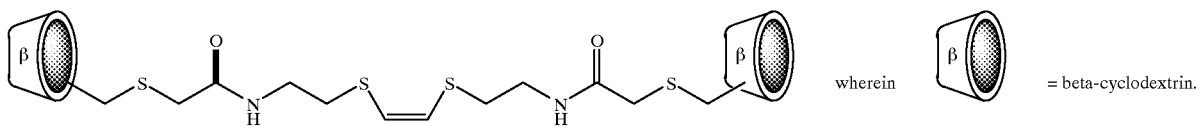

4. A composition which comprises a hydrophilic matrix comprising the composition of matter of claim 1 and a photosensitizer encapsulated within the matrix.

5. The composition of claim 4, wherein the photosensitizer is a porphyrin, a phthalocyanine, a naphthalocyanine, a chlorine a pheophorbide, or a bacteriopheophorbide.

6. The composition of claim 4, wherein the cleavable linker is cleavable upon exposure to light of a wavelength appropriate for absorption by the photosensitizer.

7. The composition of claim 4, wherein the photosensitizer is released when the cleavable linker is cleaved.

8. A method of killing a tumor cell which comprises treating the tumor cell with the composition of claim 6 and exposing the composition to light so as to cleave the cleavable linker and release the photosensitizer so that it goes into the tumor cell, wherein absorption of light by the photosensitizer excites the photosensitizer and the tumor cell is killed by singlet oxygen that is formed by energy transfer from the excited photosensitizer.

9. A method of killing a tumor cell in a subject which comprises:
 (a) administering the composition of claim 6 to the subject;
 (b) directing light at the tumor cell so as to expose the composition to light and cleave the cleavable linker thereby releasing the photosensitizer, wherein absorption of light by the photosensitizer excites the photosensitizer and generates singlet oxygen that is formed by energy transfer from the excited photosensitizer;
 (c) allowing additional composition to diffuse to the tumor cell; and
 (d) repeating steps (b) and (c) until the tumor cell is killed.

10. The method of claim 9, wherein the photosensitizer is concentrated at the tumor cell.

11. The method of claim 8 or 9, wherein a plurality of converging light beams is used to focus light on the tumor cell.

* * * * *